F. G. & E. A. FLOYD.
Corn-Planter.
No. 29,777.
Patented Aug 28, 1860.
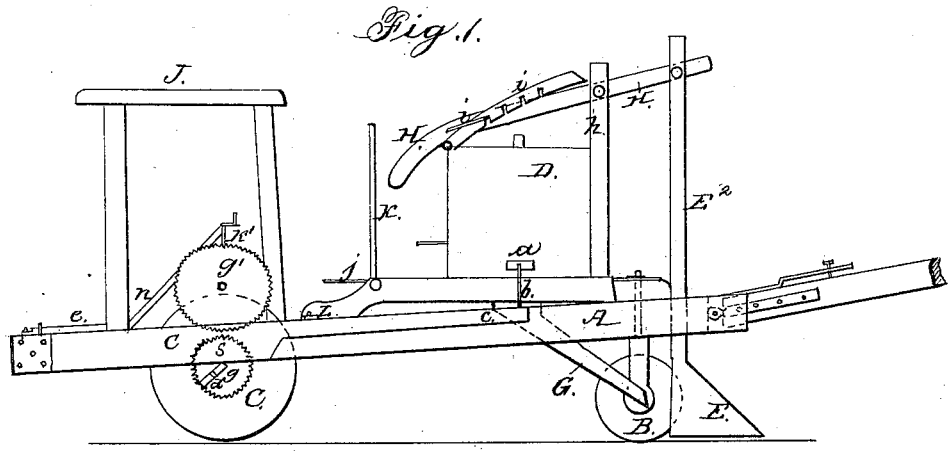
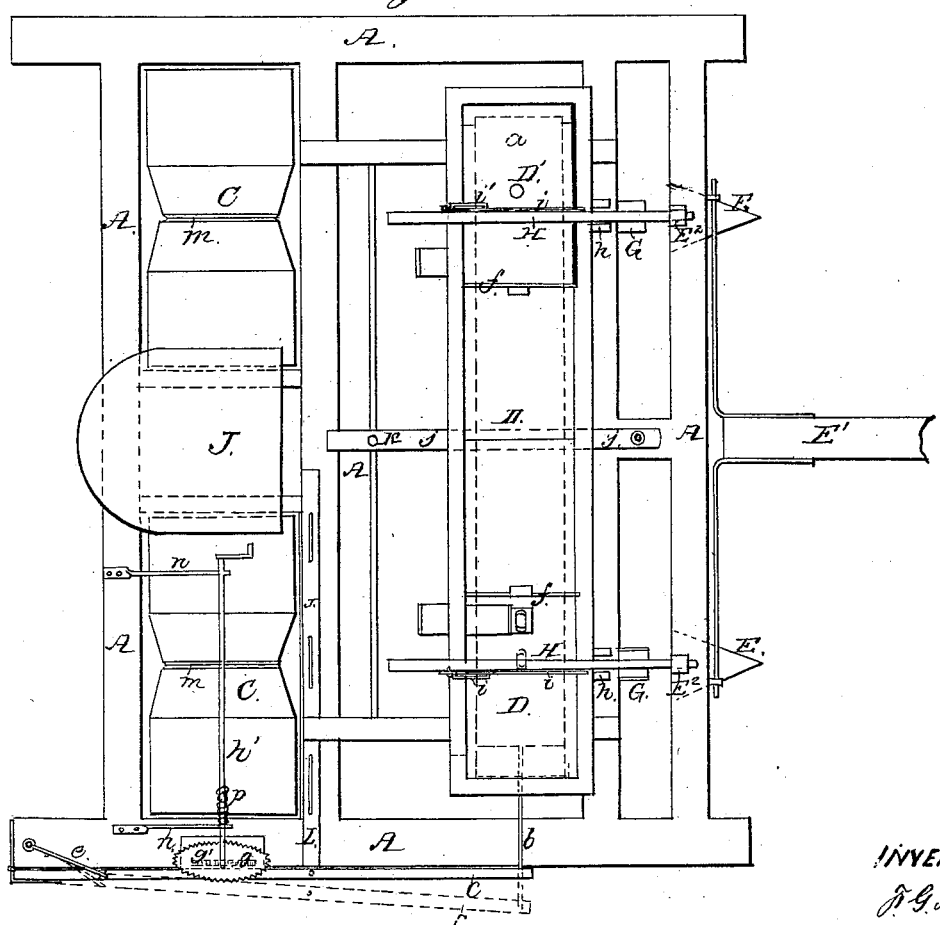

UNITED STATES PATENT OFFICE.

F. G. FLOYD AND E. A. FLOYD, OF MACOMB, ILLINOIS.

IMPROVEMENT IN CORN-PLANTERS.

Specification forming part of Letters Patent No. 29,777, dated August 28, 1860.

*To all whom it may concern:*

Be it known that we, F. G. FLOYD and E. A. FLOYD, both of Macomb, in the county of McDonough and State of Illinois, have invented a new and Improved Corn-Planter; and we do hereby declare that the following is a full, clear, and exact description thereof, reference being had to the accompanying drawings, forming a part of this specification, in which—

Figure 1 represents one side of our machine in elevation. Fig. 2 is a plan view of the same.

Similar letters of reference indicate corresponding parts in the two figures.

This invention is an improved corn-planter for opening the furrow, dropping the corn, and covering two rows at the same operation. The machine is provided with adjustable plows or shares, which open the furrows for regulating the depth required to plant, that are controlled by the driver.

The invention provides for carrying in the hopper a large supply of seed, which may be let into the dropping-boxes in small supplies, regulated according to the quantity to be deposited at each movement of the seed-slide, thus preventing the seed-apertures of the boxes from choking up in consequence of the great body and necessarily weight of seed. Provision is made for turning the machine and for starting or stopping the motion of the dropping device at the option of the driver.

To these ends our invention and improvements consist in the employment of a reciprocating seed-slide similar to those in common use, with a novel means of operating it—viz., by means of an arm provided with a friction-roller, that is connected in a suitable manner with one of the coverers or rollers, which acts upon a hinged arm so as to give to it a regular alternate vibrating motion, as will be hereinafter described, which arrangement is furnished with a cogged wheel, the shaft of which has a crank on one end for reversing the motion of the covering-roller when desired to commence the dropping at the end of a row, so as to bring the rows in a line, as will be hereinafter shown.

To enable those skilled in the art to fully understand our invention, we will proceed to described its construction and operation.

In the drawings, A represents a quadrangular frame supported in front upon a caster-wheel, B, and in the rear on rollers C C. The hopper D is supported on this frame A and extends transversely across the same, and the driver's seat is placed directly behind it.

E' is the draft-pole, to which the horses are attached, and E E are two adjustable shoes placed in the front part of frame A.

The seed-slide *a* passes longitudinally through the hopper D, and receives its reciprocating motion from a rod, *b*, that connects with the end of a bar, *c*, which is hinged to the end of one of the side timbers of frame A, as shown in Figs. 1 and 2. This bar *c* receives a vibrating motion from an arm, *d*, that is connected to one end of the shaft of pressing-rollers C, and turns with said shaft and rollers as the machine is drawn along. The arm *d* has a friction-roller on its end and forces out the bar *c* at each revolution, and a spring, *e*, acting upon the arm *d*, draws it back, thus actuating the slide *a* with a regular alternate reciprocating motion. Said slide has two holes in it, each opening into seed-boxes D' D' on each end of the hopper, for receiving the charge of seed from the boxes D' D' and dropping them into seed-tubes G G, which conduct the seed down and drop them into the furrows made by the plow or shoes E, behind said shoes. The seed-boxes D' D' are separated from the body of the hopper, which has an inclined bottom inclining from the middle of the hopper to the bottom of each box D' D', and the seed in the body of the hopper is gradually supplied to the boxes by gates *f f*, which may be closed entirely, so as to entirely prevent seed from entering the boxes D' D'. The seed placed in part D of the hopper-box will all be fed to the dropping-boxes in consequence of the inclined bottom and the jarring incident to the motion of the machine over the rough ground.

The furrows are formed by the two shoes E E, each of which is attached to the lower end of a standard, $E^2$, that passes up through the frame A, and is attached to the end of a lever, H, having its fulcrum in a post, *h*, and which is used for setting the shoes deeper or shallower in the ground, according to the depth required to plant the corn. In the drawings each lever H is shown fixed by a sector rack-bar, *i*, and loop *i'*.

The caster-wheel B is hung on the lower end of an upright standard, which passes up through the front part and middle of frame A, and has attached rigidly to its top a lever, *j*, which proceeds back, and has a hand-bar, $k$, projecting up from it, so that the driver may control the direction of the machine by moving the lever from his seat.

Behind the hopper D, and under the driver's seat J, are arranged to rollers, C C, which are grooved in the middle, as represented in the drawings, Fig. 1. These rollers serve to press the earth down over the seed and crush the clods. The small annular groove $m$ in the middle of these rollers is made so that the earth directly above the seed will not be pressed, but will allow air and moisture to pass freely down to the seed, which will materially assist its vegetation. On the end of roller C shaft, just behind the arm $d$, is fixed a spur-wheel, $g$. Over this wheel is a similar spur-wheel, $g'$, fixed to the end of a shaft, $h'$, having its bearings in braces $n$ $n$, and a crank-handle on the opposite end to the spur-wheel $g'$, which is within reach of the driver from his seat J. A spring, $p$, is placed on the shaft $h'$, for throwing its wheel out of gear from the wheel $g$. By this arrangement the driver can regulate the dropping of seed, and at the end of each row he can, by reversing the movement of the rollers C C, commence the dropping in a line with the preceding rows before starting the machine, for by pressing out the shaft $h'$ until the wheels $g$ $g'$ engage with each other the rollers C C, and consequently the arm $d$, may be turned back until the slide $a$ is in a proper position to drop a charge of corn immediately the machine starts forward. The driver will thus have a perfect control over the dropping arrangement without moving from his seat. A slide-bar, L, is placed on the floor of frame A, to be operated by the feet when necessary to stop the motion of the seed-slide. This bar by being pushed out will hold the vibrating bar $c$ in the position represented in red lines, Fig. 2, and while it is in this position the arm $d$ will not strike it in its revolution.

Having thus described our invention, what we claim as new, and desire to secuce by Letters Patent, is—

The combination, with a seed-planting frame constructed as described, of the seed-slide $a$, vibrating arm $c$, receiving its motion from arm $d$, the wheels $g$ $g'$, and shaft $h'$, arranged in the manner and for the purpose herein set forth.

F. G. FLOYD.
       E. A. FLOYD.

Witnesses:
 JOHN O'C. WILSON,
 THOS. J. COULTER.